United States Patent
Kristoffersen

(10) Patent No.: US 8,622,698 B2
(45) Date of Patent: Jan. 7, 2014

(54) ROTOR-SECTOR BASED CONTROL OF WIND TURBINES

(75) Inventor: Jacob Krogh Kristoffersen, Viby J (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 13/334,767

(22) Filed: Dec. 22, 2011

(65) Prior Publication Data

US 2012/0128488 A1 May 24, 2012

(51) Int. Cl.
*F03D 7/04* (2006.01)
(52) U.S. Cl.
USPC .................. 416/1; 416/27; 416/37; 290/44
(58) Field of Classification Search
USPC ............ 416/1, 27, 36, 37, 40, 41, 44; 415/30; 290/44, 55
See application file for complete search history.

(56) References Cited

U.S. PATENT DOCUMENTS

| 6,320,272 | B1* | 11/2001 | Lading et al. | 290/44 |
|---|---|---|---|---|
| 7,281,891 | B2* | 10/2007 | Smith et al. | 415/4.3 |
| 7,950,901 | B2* | 5/2011 | Barbu et al. | 416/1 |
| 8,100,647 | B2* | 1/2012 | Godsk et al. | 416/1 |
| 8,202,049 | B2* | 6/2012 | Rogers et al. | 416/1 |
| 8,441,138 | B2* | 5/2013 | Gjerlov et al. | 290/44 |
| 2006/0145483 | A1* | 7/2006 | Larsen et al. | 290/44 |
| 2009/0046289 | A1* | 2/2009 | Caldwell et al. | 356/341 |
| 2010/0014969 | A1* | 1/2010 | Wilson et al. | 416/1 |
| 2010/0014971 | A1* | 1/2010 | Risager et al. | 416/1 |
| 2010/0092292 | A1* | 4/2010 | Nies et al. | 416/41 |
| 2011/0229300 | A1* | 9/2011 | Kanev et al. | 415/1 |

FOREIGN PATENT DOCUMENTS

| EP | 1770278 A2 | | 4/2007 |
|---|---|---|---|
| FR | 2938075 | * | 5/2010 |
| WO | 2011/076295 A2 | | 6/2011 |
| WO | 2011/097022 A1 | | 8/2011 |

OTHER PUBLICATIONS

Jenaro et al., On-board wind detecting and measuring device for aircraft, May 7, 2010, Abstract of FR2938075.*
Jenaro et al., On-board wind detecting and measuring device for aircraft, May 7, 2010, Machine translation of FR2938075.*
Vaughan et al., Laser Doppler Velocimetry Applied to the Measurement of Local and Global Wind, 1989, Wind Engineering, vol. 13, No. 1 pp. 1-15 XP-002057358.*
Danish Patent and Trademark Office, Search Report and Written Opinion in related Danish Application No. PA 2012 70004 dated Apr. 16, 2012.

* cited by examiner

*Primary Examiner* — Edward Look
*Assistant Examiner* — Liam McDowell
(74) *Attorney, Agent, or Firm* — Patterson & Sheridan, LLP

(57) ABSTRACT

Blades of a wind turbine attached to a rotor hub for rotation in a rotor plane may be adjusted by a control system for individually pitching the blades relative to the hub. The rotor planes divided into a plurality of predefined section, wherein each section has an associated pitch reference value. A light detection and ranging device may be used to determine expected properties of wind in each respective section of the rotor plane so that the pitch reference value may be adjusted accordingly.

20 Claims, 5 Drawing Sheets

ROTOR-SECTOR BASED CONTROL OF WIND TURBINES

FIELD OF THE INVENTION

Embodiments of the invention generally relate to controlling a wind turbine comprising blades attached to a rotor hub for rotation in a rotor plane and a control system for individually pitching the blades relative to the hub with the aim of reducing the risk of single or successive extreme loads on the blades, tower or other wind turbine components.

BACKGROUND

In recent years, there has been an increased focus on reducing emissions of greenhouse gases generated by burning fossil fuels. One solution for reducing greenhouse gas emissions is developing renewable sources of energy. Particularly, energy derived from the wind has proven to be an environmentally safe and reliable source of energy, which can reduce dependence on fossil fuels.

Energy in wind can be captured by a wind turbine, which is a rotating machine that converts the kinetic energy of the wind into mechanical energy, and the mechanical energy subsequently into electrical power. Common horizontal-axis wind turbines include a tower, a nacelle located at the apex of the tower, and a rotor that is supported in the nacelle by means of a shaft. The shaft couples the rotor either directly or indirectly with a rotor assembly of a generator housed inside the nacelle. A plurality of wind turbines generators may be arranged together in a wind park or wind power plant to generate sufficient energy to support a grid.

Most modern wind turbines are controlled and regulated continuously most often with the purpose of ensuring maximum power extraction from the wind under the current wind, and weather, while at the same time ensuring that the loads on the different components of the wind turbine are at any time kept within acceptable limits. To accomplish this, a number of parameters are collected and monitored by the controllers in a wind turbine, such as, for instance, the current wind speed and direction, the rotational speed of the rotor, the pitch angle of each blade, the yaw angle, information on the grid system, and measured parameters (e.g. stresses or vibrations) from sensors placed e.g. on the blades, the nacelle, or on the tower.

Based on these and following some control strategy the optimal control parameters of the turbine in order to perform optimally under the given conditions are determined. The current performance, and thereby the power production and the load situation of the wind turbine is primarily controlled by controlling the pitch angles of the blades, but may further include adjusting for instance any different active aerodynamic devices for changing the aerodynamic surfaces of the blades such as flaps or vortex generating means, adjusting the power, and/or adjusting the rotational speed of the rotor.

Wind turbines are traditionally constructed and controlled according to standards and according to wind maps and incorporating the trade-off of maximizing the annual energy production by the wind turbine while on the same time ensuring a certain life time of the turbine i.e. keeping the loads on the different components of the wind turbine within acceptable limits at all times and over time. Wind turbines are therefore typically designed according to a certain (high) turbulence but will most often be operating at a lower turbulence level and may in some conditions be controlled too conservative, while in some conditions not conservative enough resulting in undesired fatigue or extreme loads on the wind turbine components, especially the blades, nacelle and tower.

SUMMARY OF THE INVENTION

Embodiments of the invention generally relate to controlling a wind turbine comprising blades attached to a rotor hub for rotation in a rotor plane and a control system for individually pitching the blades relative to the hub with the aim of reducing the risk of single or successive extreme loads on the blades, tower or other wind turbine components.

One embodiment of the invention provides a method for controlling a wind turbine. The method generally comprises determining one or more properties of wind in a first section of a plane in front of a wind turbine rotor plane, and determining expected one or more properties of wind in a second section of the wind turbine rotor plane based on the one or more properties of wind determined in the first section. The method further comprises determining a pitch angle of the second section based on the expected one or more properties of wind in the second section, and adjusting a pitch angle of a wind turbine blade to the pitch angle of the second section as the wind turbine blade passes through the second section.

Another embodiment of the invention provides a wind turbine, generally comprising a rotor comprising at least one blade, wherein a rotor plane of the rotor is divided into a plurality of predefined sections, a light detection and ranging (LIDAR) device configured to measure one or more properties of wind in a plurality of predefined sections of a plane in front of the rotor plane, wherein each section of the plane in front of the rotor plane corresponds to a section of the rotor plane, and a controller. The controller is generally configured to receive, from the LIDAR device, one or more properties of wind in a first section of the plurality of predefined sections of the plane in front of the rotor plane, and determine expected one or more properties of wind in a second section of the plurality of predefined sections of the rotor plane, wherein the first section corresponds to the second section. The controller is further configured to determine a pitch angle of the second section based on the expected one or more properties of wind in the second section, and adjust a pitch angle of the at least one blade to the pitch angle of the second section as the blade passes through the second section.

Yet another embodiment of the invention provides a wind turbine controller, generally configured to receive one or more properties of wind in a first section of a plurality of predefined sections of a plane in front of a rotor plane, and determine expected one or more properties of wind in a second section of a plurality of predefined sections of the rotor plane, wherein the first section corresponds to the second section. The controller is further configured to determine a pitch angle of the second section based on the expected one or more properties of wind in the second section, and adjust a pitch angle of a wind turbine blade to the pitch angle of the second section as the wind turbine blade passes through the second section.

BRIEF DESCRIPTION OF THE DRAWINGS

Embodiments of the present invention are explained, by way of example, and with reference to the accompanying drawings. It is to be noted that the appended drawings illustrate only examples of embodiments of this invention and are therefore not to be considered limiting of its scope, for the invention may admit to other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention.

Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Figure 1:
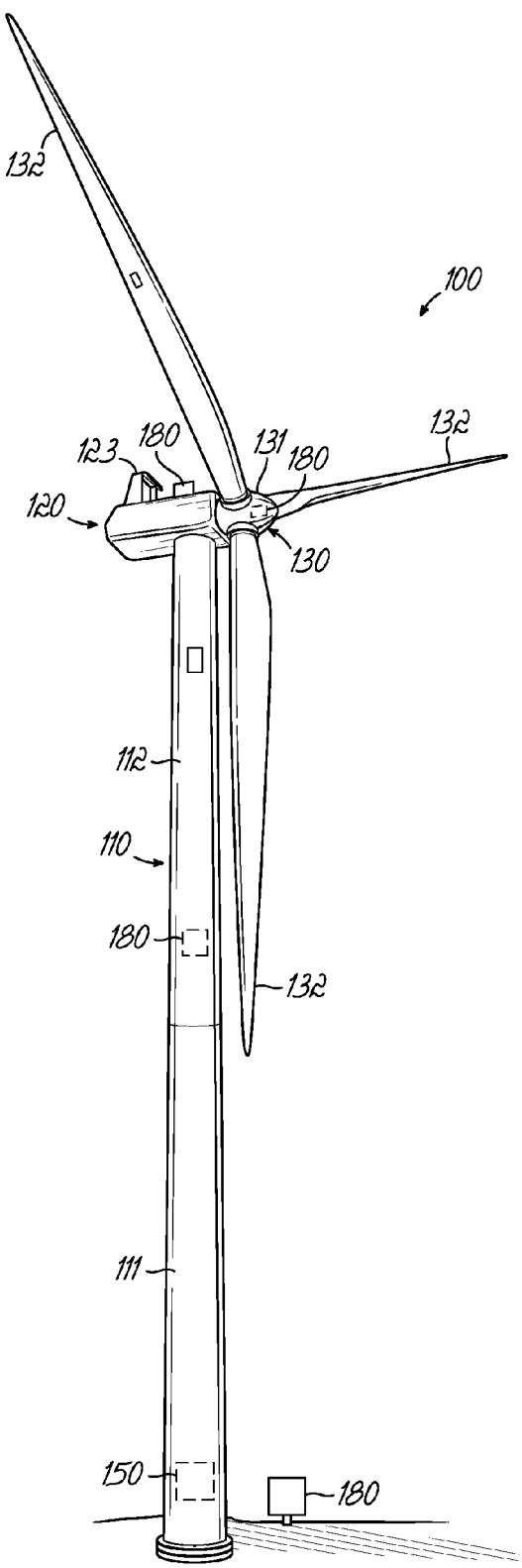
FIG. 1 illustrates an exemplary wind turbine according to an embodiment of the invention.

FIG. 1 illustrates an exemplary wind turbine 100 according to an embodiment of the invention. As illustrated in FIG. 1, the wind turbine 100 includes a tower 110, a nacelle 120, and a rotor 130. In one embodiment of the invention, the wind turbine 100 may be an onshore wind turbine. However, embodiments of the invention are not limited only to onshore wind turbines. In alternative embodiments, the wind turbine 100 may be an off shore wind turbine located over a water body such as, for example, a lake, an ocean, or the like.

The tower 110 of wind turbine 100 may be configured to raise the nacelle 120 and the rotor 130 to a height where strong, less turbulent, and generally unobstructed flow of air may be received by the rotor 130. The height of the tower 110 may be any reasonable height. The tower 110 may be made from any type of material, for example, steel, concrete, or the like. In some embodiments the tower 110 may be made from a monolithic material. However, in alternative embodiments, the tower 110 may include a plurality of sections, for example, two or more tubular steel sections 111 and 112, as illustrated in FIG. 1. In some embodiments of the invention, the tower 110 may be a lattice tower. Accordingly, the tower 110 may include welded steel profiles.

The rotor 130 may include a rotor hub (hereinafter referred to simply as the "hub") 131 and at least one blade 132 (three such blades 132 are shown in FIG. 1). The rotor hub 131 may be configured to couple the at least one blade 132 to a shaft (not shown). In one embodiment, the blades 132 may have an aerodynamic profile such that, at predefined wind speeds, the blades 132 experience lift, thereby causing the blades to radially rotate around the hub. The nacelle 120 may include one or more components configured to convert aero-mechanical energy of the blades to rotational energy of the shaft, and the rotational energy of the shaft into electrical energy.

FIG. 1 also depicts a wind sensor 123. Wind sensor 123 may be configured to detect a direction of the wind at or near the wind turbine 100. By detecting the direction of the wind, the wind sensor 123 may provide useful data that may determine operations to yaw the wind turbine 100 into the wind. The wind sensor 123 may use the speed and/or direction of the wind to control the blade pitch angle. Wind speed data may be used to determine an appropriate pitch angle that allows the blades 132 to capture a desired amount of energy from the wind or to avoid excessive loads on turbine components. In some embodiments, the wind sensor 123 may be integrated with a temperature sensor, pressure sensor, and the like, which may provide additional data regarding the environment surrounding the wind turbine. Such data may be used to determine one or more operational parameters of the wind turbine to facilitate capturing of a desired amount of energy by the wind turbine 100 or to avoid damage to components of the wind turbine.

In one embodiment of the invention, a light detection and ranging (LIDAR) device 180 may be provided on or near the wind turbine 100. For example, the LIDAR 180 may be placed on a nacelle, hub, and/or tower of the wind turbine, as illustrated in FIG. 1. In alternative embodiments, the LIDAR 180 may be placed in one or more blades 132 of the wind turbine 100. In some other embodiments, the LIDAR device may be placed near the wind turbine 100, for example, on the ground as shown in FIG. 1. In general, the LIDAR 180 may be configured to detect wind speed and/or direction at one or more points in front of the wind turbine 100. In other words, the LIDAR 180 may allow the wind turbine to detect wind speed before the wind actually reaches the wind turbine. This may allow wind turbine 100 to proactively adjust one or more of blade pitch angle, generator torque, yaw position, and like operational parameters to capture greater energy from the wind, reduce loads on turbine components, and the like. In some embodiments, a controller may be configured to combine the data received from a LIDAR device 180 and the wind sensor 123 to generate a more accurate measure of wind speed and/or direction.

Figure 2:
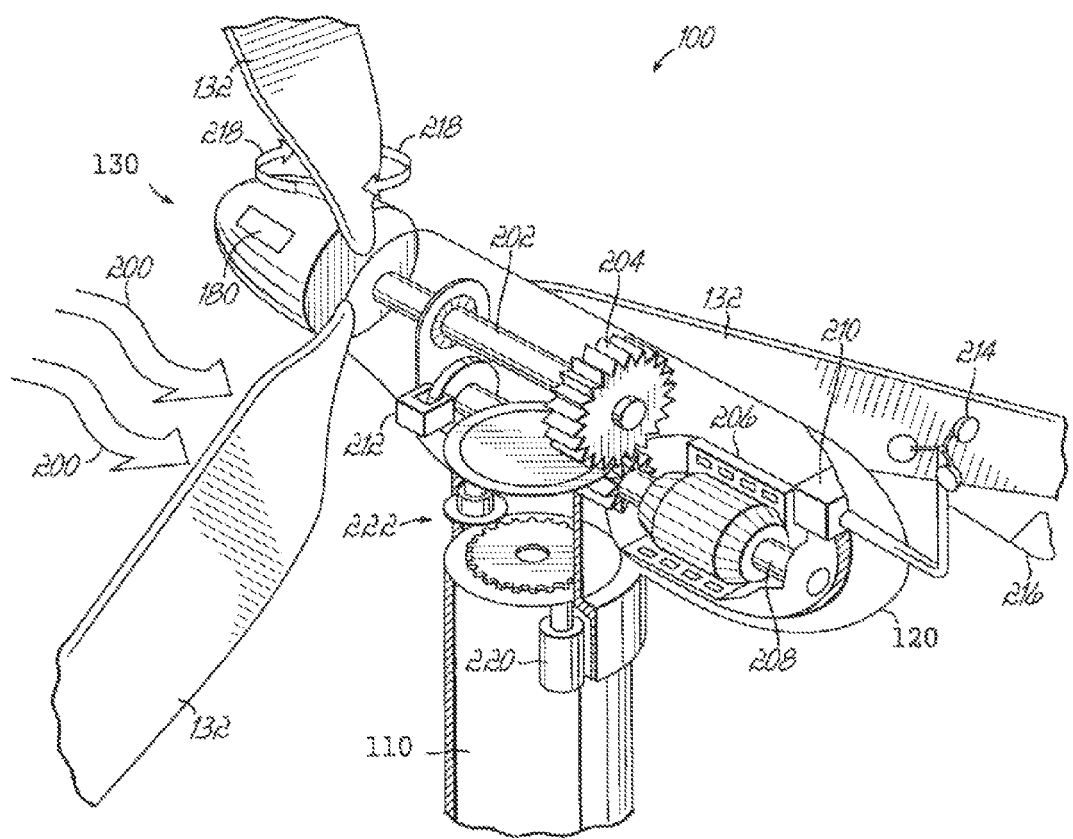
FIG. 2 illustrates an exemplary wind turbine nacelle according to an embodiment of the invention.

FIG. 2 illustrates a diagrammatic view of typical components internal to the nacelle 120 and tower 110 of a wind turbine generator 100. When the wind 200 pushes on the blades 132, the rotor 130 spins, thereby rotating a low-speed shaft 202. Gears in a gearbox 204 mechanically convert the low rotational speed of the low-speed shaft 202 into a relatively high rotational speed of a high-speed shaft 208 suitable for generating electricity using a generator 206. In an alternative embodiment, the gear box may be omitted, and a single shaft, e.g., the shaft 202 may be directly coupled with the generator 206.

A controller 210 may sense the rotational speed of one or both of the shafts 202, 208. If the controller decides that the shaft(s) are rotating too fast, the controller may signal a braking system 212 to slow the rotation of the shafts, which slows the rotation of the rotor 130, in turn. The braking system 212 may prevent damage to the components of the wind turbine generator 100. The controller 210 may also receive inputs from an anemometer 214 (providing wind speed) and/or a wind vane 216 (providing wind direction). Based on information received, the controller 210 may send a control signal to one or more of the blades 132 in an effort to adjust the pitch 218 of the blades. By adjusting the pitch 218 of the blades with respect to the wind direction, the rotational speed of the rotor (and therefore, the shafts 202, 208) may be increased or decreased. Based on the wind direction, for example, the controller 210 may send a control signal to an assembly comprising a yaw motor 220 and a yaw drive 222 to rotate the nacelle 120 with respect to the tower 110, such that the rotor 130 may be positioned to face more (or, in certain circumstances, less) upwind or downwind (if it is a downwind turbine).

The generator 206 may be configured to generate a three phase alternating current based on one or more grid requirements. In one embodiment, the generator 206 may be a synchronous generator. Synchronous generators may be configured to operate at a constant speed, and may be directly connected to the grid. In some embodiments, the generator 206 may be a permanent magnet generator. In alternative embodiments, the generator 206 may be an asynchronous generator, also sometimes known as an induction generator. Induction generators may or may not be directly connected to the grid. For example, in some embodiments, the generator 206 may be coupled to the grid via one or more electrical devices configured to, for example, adjust current, voltage, and other electrical parameters to conform with one or more grid requirements. Exemplary electrical devices include, for example, inverters, converters, resistors, switches, transformers, and the like.

Embodiments of the invention are not limited to any particular type of generator or arrangement of the generator and one or more electrical devices associated with the generator in relation to the electrical grid. Any suitable type of generator including (but not limited to) induction generators, permanent magnet generators, synchronous generators, or the like, configured to generate electricity according to grid requirements falls within the purview of the invention. FIG. 2 also illustrates an exemplary hub mounted LIDAR 180 according to an embodiment of the invention. While shown on the hub in FIG. 2, in alternative embodiments, the LIDAR device 180 may be placed on or near any location of the turbine, e.g., on the ground, in the blades, on the nacelle, on the tower, and the like.

Embodiments of the invention generally relate to controlling wind turbine blades attached to a rotor hub for rotation in a rotor plane, and a control system for individually pitching the blades relative to the hub with the aim of increasing energy capture and/or reducing the risk of single or successive extreme loads on the blades, tower or other wind turbine components. As wind turbine rotors continue to increase in size the variation in wind speeds experienced in different parts of the rotor plane has also increased. Accordingly, while one section of the rotor plane may experience a wind gust that may damage components of the wind turbine, other sections of the rotor plane may experience more acceptable wind speeds. Therefore, embodiments of the invention provide methods and systems for individually pitching wind turbine blades depending on the section of the rotor plane in which the blade is passing through. To facilitate such control, the rotor plane may be divided into a plurality of predefined sections.

Figure 3:
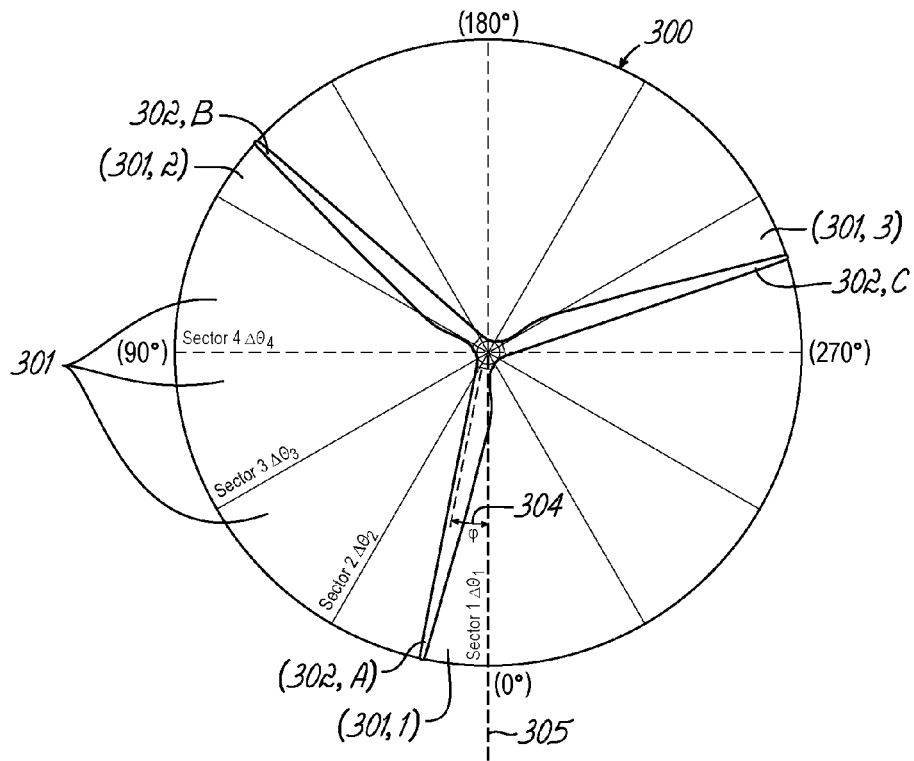
FIG. 3 illustrates division of an exemplary rotor plane into a plurality of sections, according to an embodiment of the invention.

FIG. 3 illustrates a method for dividing the rotor plane 300 of a wind turbine into a number of sectors 301 according to an embodiment of the invention. In this example, the rotor plane 300 is divided into 12 equally sized rotor sectors 301. The rotor blades 302 denominated A, B, and C are outlined in a position where the rotor blade A is in the first sector (301,1), the rotor blade B is in sector 5 (301,2), and the third rotor blade C is in sector number 8 (301,3). The vertical line 305 illustrates the tower axis of the wind turbine.

In order to reduce the risk of inducing tilt/yaw moments by the individual pitch control method according to the invention, the number of sectors may advantageously be set according to the following rule thereby ensuring that all blades change sectors synchronously:

$$\left(\frac{N_S}{3}\right) \in Z^+$$

where $N_S$ is the number of rotor sectors 301. The azimuth sensor measuring the azimuth angle 304 of one or more blades 301 may be used to determine the sectors which contain a blade at a given time. In this way, a vector S comprising as its elements the numbers of the sectors comprising a rotor blade, may be determined from the sector boundary angles defined by:

$$\varphi_{s,start} = (s-1)\frac{360}{N_s}$$
$$\varphi_{s,stop} = s\frac{360}{N_s}$$
$$s = 1, 2, \ldots, N_s$$

That is, for e.g. $N_S=12$, sector 2 is defined for azimuth angles in the interval [30°; 60°]. Embodiments of the invention are not limited by the specific method of dividing the rotor plane described hereinabove. In alternative embodiments, any method may be used to define any number of rotor plane section, wherein each section may have any size, shape, etc.

By defining one or more rotor sections, a controller (e.g., the controller 210 in FIG. 2) of the wind turbine may determine a predefined pitch angle for each rotor section based on wind properties that are experienced or expected in that section. For example, rotor sections experiencing wind gusts may have predefined pitch angles that mitigate loads on a blade passing therethrough. In other section, the blade pitch angle may be selected such that maximum energy is captured from the wind. As each wind turbine blade rotates through the rotor plane, passing through multiple predefined rotor sections, the blade pitch angle may be adjusted to the corresponding pitch angle for the section through which it is passing, thereby allowing for maximum energy capture and/or preventing damage to wind turbine components.

In some embodiments, it may be desirable to proactively adjust pitch angles of blades based on expected wind conditions in a given section of the rotor plane. Such proactive adjustments may be more advantageous than reactive adjustments because they may improve the life of wind turbine components by reducing exposure to damaging loads.

Figure 4:
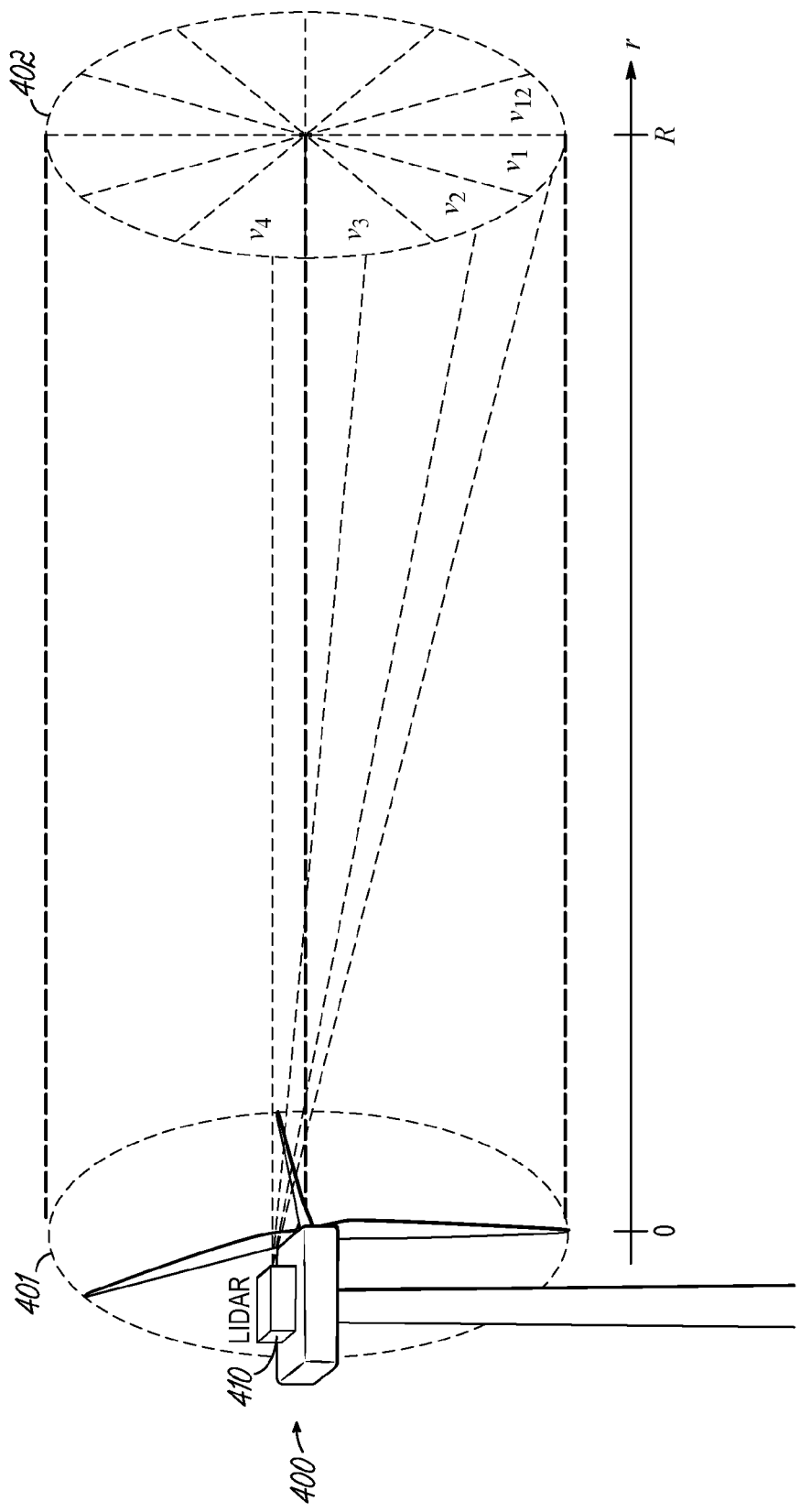
FIG. 4 illustrates exemplary operation of a light detection and ranging (LIDAR) device, according to an embodiment of the invention.

In one embodiment of the invention, a wind sensing device, for example the LIDAR 180 shown in FIG. 1 may be used to determine wind properties ahead of a rotor plane. Exemplary wind properties may include wind direction, wind speed, turbulence, or the like. FIG. 4 illustrates an exemplary wind turbine 400 having a rotor plane 401. The rotor plane 401 may be divided into a predefined number of sections using, for example, the method described in FIG. 3. In one embodiment, a LIDAR unit 410 may be configured to determine wind properties in a rotor plane 402 a predefined distance R from the rotor plane 401, as is illustrated in FIG. 4. In particular, the LIDAR unit 410 may be configured to determine wind properties in predefined sections on the rotor plane 402 (e.g., the sections v1, v2, v3 . . . ). In one embodiment, the rotor plane 402 may be the same size as the rotor plane 401. However, in alternative embodiments, the rotor planes 401 and 402 may have different sizes.

Each predefined section of the rotor plane 402 may correspond to a respective predefined section in rotor plane 401. Therefore, the measurement of wind properties in a section of rotor plane 402 may indicate the expected wind properties at a corresponding section of rotor plane 401 in the future. Therefore, a controller of the wind turbine 400 may be able to proactively adjust operational parameters, e.g., pitch angle, for the corresponding sector of rotor plane 401 to, for example, increase energy capture, prevent damage, or the like. In one embodiment, the mapping between the sections of rotor plane 401 and sections of rotor plane 402 may be a static mapping that is predefined. However, in alternative embodiments, the mapping between sections of rotor planes 401 and 402 may be dynamically determined based on, for example, a model defining transformation of the wind field between the rotor plane 402 and 401.

Figure 5:
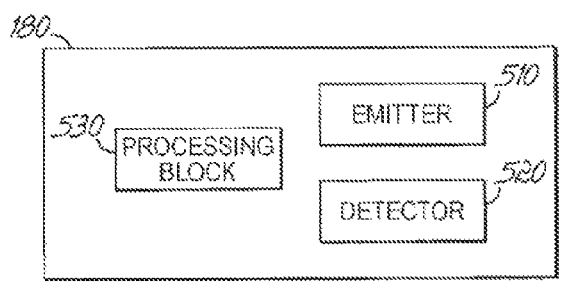
FIG. 5 illustrates an exemplary LIDAR device according to an embodiment of the invention.

FIG. 5 illustrates an exemplary view of components within a LIDAR 180 according to an embodiment of the invention. As illustrated, LIDAR 180 may include an emitter 510, a detector 520, and a processing block 530. While a single emitter detector pair 510-520 are shown in FIG. 5, in alternative embodiments, the LIDAR 180 may include any number of emitters and/or detectors. For example, different emitter-detector pairs may be configured to measure wind properties in different one or more sections of a rotor plane 402. In one embodiment of the invention, an emitter-detector may be capable of performing a scanning operation to measure wind properties at a plurality of points, e.g., in different predefined rotor sections of rotor plane 402.

The emitter 510 may be configured to generate a light beam. For example, in one embodiment, LIDAR 180 may be configured to emit an ultra violet, visible, near infra-red and/or infra-red light beam. The detector 520 may be configured to detect backscattering of the light beam emitted by the emitter from one or more objects. The processing block 530 may be configured to determine one or more properties of the backscattered light detected by detector 520 and determine one or more properties of the one or more objects from which the light beam is reflected.

As stated previously, the LIDAR 180 may be used to measure wind speed and/or direction at a remote location. Knowledge about the wind speed and direction at a remote location, e.g., in front of a rotor of a wind turbine, may allow the wind turbine to optimize one or more operational parameters such as blade pitch angle and/or generator torque to reduce loads on wind turbine components and/or increase energy capture. To measure the wind speed remotely, a light beam (e.g., a Laser beam) may be emitted into oncoming wind by, for example, emitter 510 of the LIDAR 180. The emitted light may reflect off of aerosols (e.g., pollen, dust) in the wind and may be scattered in multiple directions. A portion of the scattered light may travel back to the LIDAR 180, and may be detected by, e.g., the detector 520 of LIDAR 180. Based on the backscattered light, one or more properties of the aerosols may be determined by the processing block 530. For example, the processing block 530 may use the Doppler Effect to determine properties of the aerosols. Because the properties of the aerosols strongly correlate with the property of the wind carrying the aerosols, properties of the wind, e.g. wind speed and direction, may be determined based on the properties of the aerosols.

Figure 6:
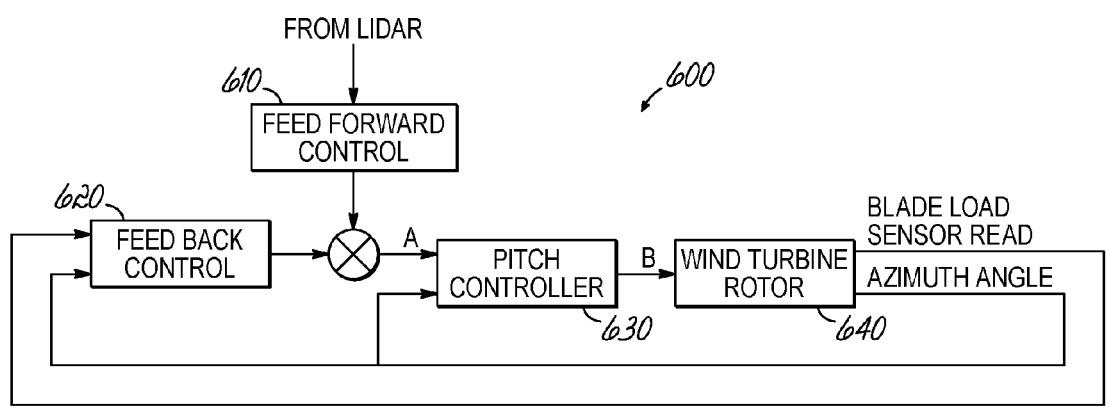
FIG. 6 illustrates an exemplary control system according to an embodiment of the invention.

FIG. 6 illustrates an exemplary control system 600 according to an embodiment of the invention. As illustrated, control system 600 may include a feed forward control block (FFC) 610, a feedback control block (FBC) 620, a pitch controller 630, and a wind turbine rotor 640. In one embodiment, the FFC block 610, FBC 620, and pitch controller 630 may be a part of a larger control system or controller, for example, the controller 210 in FIG. 2. For each predefined section of the rotor plane of the wind turbine, the FFC 610 may be configured to receive, from a LIDAR unit, one or more wind properties measured in a corresponding section of a plane in front of the rotor (as described above). The FFC block 610 may determine a desired pitch angle for the predefined section of the rotor plane based on the measured wind properties. The desired pitch angle may be determined based on capturing maximum energy from the wind, and/or avoiding damage to wind turbine components, or the like.

The FBC block 620 may be configured to receive blade load sensor readings from the wind turbine rotor 640. The FBC may also receive blade azimuth angle readings for each blade. Therefore, the FBC may be configured to determine blade load in each predefined section of the rotor. Based on actual blade loads experienced in each predefined section of the rotor plane, the FBC block 620 may be configured to determine the desired pitch angle for each wind turbine section. The FBC block provides real time feedback on actual loads experienced by the wind turbine blades, thereby allowing further fine tuning of pitch angles that are defined for each section of the rotor plane based on expected wind properties. While the FBC block 620 provides distinct advantages, in some embodiments of the invention, the FBC block 620 may be omitted, and the pitch angle for each section of the wind turbine rotor plane may be determined based on LIDAR measurements alone.

In one embodiment, the output of the FFC block 610 and FBC block 620 may be combined by, for example, computing an average or weighted average of the outputs A. The combined output may be provided to a pitch controller 630. The pitch controller 630 may be configured to determine the location of each blade as it moves through the rotor plane, and adjust the blade pitch angle of each blade based on predefined blade pitch angles determined for each section of the rotor plane. In one embodiment, the blade pitch angles for each rotor plane section may be derived from the combined output A from the FFC 610 and FBC 620.

In one embodiment, the combined output A may be an offset value that may be applied to a common pitch reference signal that may be determined for all blades of a turbine. For example, the pitch controller may determine based on average wind conditions detected by, for example, a wind sensor, that all blades of the wind turbine should have a common pitch angle X. Thereafter, based on the outputs of the FFC 610 and FBC 620, the pitch controller may adjust the common pitch angle by the offset value A for a given rotor plane section to alleviate loads, increase energy capture or the like, when a blade passes through that section.

Figure 7:
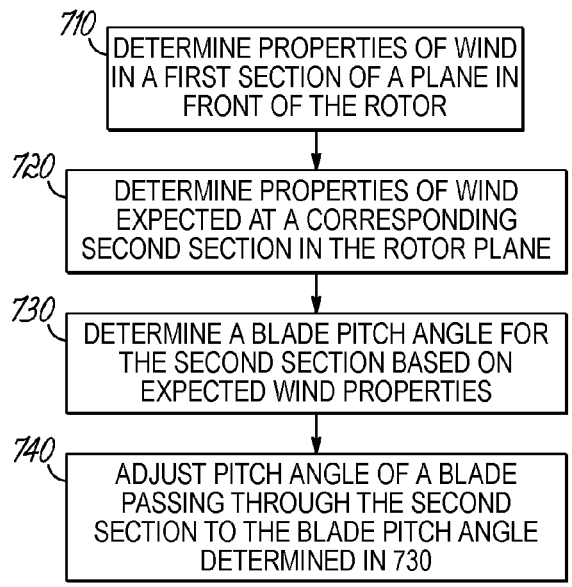
FIG. 7 is a flow diagram of exemplary control operations according to an embodiment of the invention.

FIG. 7 is a flow diagram of exemplary operations performed by a controller of a wind turbine, according to an embodiment of the invention. The controller may be, for example, the controller 210, control system 600, or the like. The operations may begin in step 710 by determining properties of wind in a first section of a plane in front of a wind turbine rotor plane. The properties of wind expected at a corresponding second section of the wind turbine rotor plane may be determined based on the properties determined in the section of the plane ahead of the wind turbine rotor plane, in step 720. In step 730, a blade pitch angle may be determined for the section of the wind turbine rotor plane. In step 740, the blade pitch angle of each wind turbine blade may be proactively adjusted to the determined blade pitch angle while the blade passes through the section of the wind turbine rotor plane. In some embodiments, step 720 may be omitted and the blade pitch angle for the section of a rotor plane may be determined simply based upon measurements in a corresponding section in a plane in front of the rotor plane.

Figure 8A:
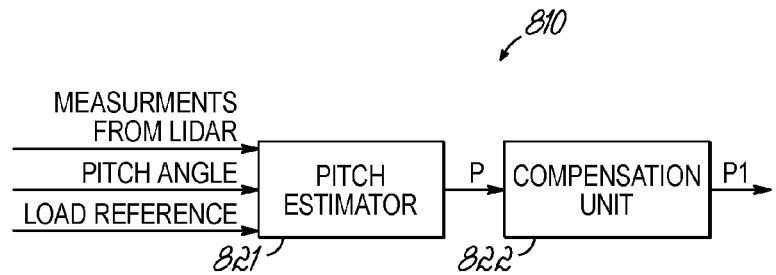
FIGS. 8A-B illustrate exemplary pitch control systems according to an embodiment of the invention.
Figure 8B:
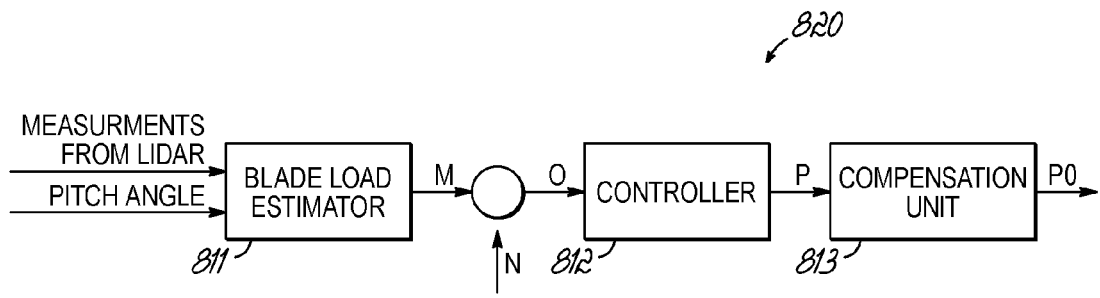

FIGS. 8A and 8B illustrate exemplary pitch control systems according to an embodiment of the invention. In one embodiment, the pitch control systems of FIGS. 8A and 8B may be a part of the feed forward controller 610 illustrated in FIG. 6. In general, the pitch control systems may be configured to determine a pitch angle or a pitch offset (for each section of the rotor plane) based on input received from a LIDAR unit. For example, FIG. 8A illustrates an exemplary pitch control system 820 according to an embodiment of the invention. As illustrated, the pitch control system 820 may include a pitch estimator 821 and a compensation unit 822. The pitch estimator 821 may be configured to receive, as input, one or more parameters measured by a LIDAR unit, e.g., wind speed and wind direction. The pitch estimator 821 may also be configured to receive the current pitch angle and a blade load reference value as inputs, as shown in FIG. 8A. Based on the received inputs, the pitch estimator 821 may be configured to determine an optimal pitch angle or pitch offset P, which may be transferred to the compensation unit 822.

The compensation unit 822 may be configured to generate a pitch reference signal P1 based upon wind field propagation and pitch system dynamics. In other words, the compensation unit may be configured to determine when certain wind conditions can be expected at the rotor plane, and adjust the pitch angles at a given section of the rotor plane based upon the operational conditions of the pitch system.

FIG. 8B illustrates a particular embodiment of the pitch control system 820 of FIG. 8A. As illustrated, the pitch control system 810 of FIG. 8B may include a blade load estimator 811, a controller 812, and a compensation unit 813. The blade load estimator 811 may be configured to receive, as input, one or more parameters measured by a LIDAR unit, e.g., wind speed and wind direction. The blade load estimator may also be configured to receive the current pitch angle as an input, as shown in FIG. 8B. In one embodiment, the blade load estimator, using a blade model, may determine an expected or predicted blade load M based on the current pitch angle, and the one or more parameters measured by the LIDAR unit.

The expected blade load M may be compared to a reference blade load value N. The reference blade load value N may be a desired blade load value or a threshold blade load value. As illustrated in FIG. 8B, a difference between M and N (shown as the value O in FIG. 8*b*) may be transferred to the controller 812. In one embodiment, the controller 812 may be a Proportional Integral Derivative (PID) controller. The controller 812 may determine a pitch reference value P or a pitch offset value based on the difference O. The compensation unit 822 may perform the same function as the compensation unit 813 of FIG. 8A and produce a reference signal P0.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

What is claimed is:

1. A method for controlling a wind turbine comprising a rotor, the method comprising:
    determining one or more properties of wind in a first section of a plurality of predefined sections of a plane in front of a wind turbine rotor plane,
        wherein each of the plurality of sections of the plane in front of the wind turbine rotor plane corresponds to a respective one of a plurality of predefined sections of the wind turbine rotor plane,
        wherein a second section of the plurality of predefined sections of the wind turbine rotor plane corresponds to the first section of the plane in front of the wind turbine rotor plane,
        and wherein the plurality of predefined sections of the wind turbine rotor plane are defined as angles of rotation of the rotor;
    determining a pitch angle assigned to the second section based on the one or more properties of wind in the first section; and
    adjusting a pitch angle of a wind turbine blade to the pitch angle assigned to the second section as the wind turbine blade passes through the second section.

2. The method of claim 1, further comprising determining expected one or more properties of wind in the second section based on the one or more properties of wind determined in the first section, and determining the pitch angle of the second section based on the expected one or more properties of wind in the second section.

3. The method of claim 1, wherein adjusting a pitch angle of a wind turbine blade to the pitch angle of the second section as the wind turbine blade passes through the second section comprises compensating the pitch angle of the second section based on wind field propagation and pitch system dynamics.

4. The method of claim 1, wherein the one or more properties of wind in the first section are measured with a light detection and ranging (LIDAR) device.

5. The method of claim 1, wherein the pitch angle of the second section is an offset value that is applied to a common pitch reference angle applied to all blades of the wind turbine.

6. The method of claim 1, wherein determining the pitch angle of the second section comprises comparing an expected blade load value to a blade load reference value to obtain a desired pitch angle value, wherein the desired pitch angle maintains blade loads at or below the blade load reference value.

7. The method of claim 1, wherein correspondence between sections is dynamically determined based on a model defining a transformation of a wind field between the plane in front of the rotor plane and the rotor plane.

8. A wind turbine, comprising:
    a rotor comprising at least one blade, wherein a rotor plane of the rotor is divided into a plurality of predefined sections defined as angles of rotation of the rotor;
    a light detection and ranging (LIDAR) device configured to measure one or more properties of wind in a plurality of predefined sections of a plane in front of the rotor plane, wherein each section of the plane in front of the rotor plane corresponds to a respective section of the rotor plane; and a controller configured to:
receive, from the LIDAR device, one or more properties of wind in a first section of the plurality of predefined sections of the plane in front of the rotor plane;
determine a pitch angle assigned to a second section, corresponding to the first section, of the plurality of predefined sections of the rotor plane based on the one or more properties of wind in the first section; and
adjust a pitch angle of the at least one blade to the pitch angle assigned to the second section as the blade passes through the second section.

9. The wind turbine of claim 8, wherein the controller is further configured to determine expected one or more properties of wind in the second section based on the one or more properties of wind determined in the first section, and determine the pitch angle of the second section based on the expected one or more properties of wind in the second section.

10. The wind turbine of claim 8, wherein the pitch angle of the second section is an offset value that is applied to a common pitch reference angle applied to all blades of the wind turbine.

11. The wind turbine of claim 8, wherein determining the pitch angle of the second section comprises comparing an expected blade load value to a blade load reference value to obtain a desired pitch angle value, wherein the desired pitch angle maintains blade loads at or below the blade load reference value.

12. The wind turbine of claim 8, wherein adjusting a pitch angle of a wind turbine blade to the pitch angle of the second section as the wind turbine blade passes through the second section comprises compensating the pitch angle of the second section based on wind field propagation and pitch system dynamics.

13. The wind turbine of claim 8, wherein correspondence between sections is dynamically determined based on a model defining a transformation of a wind field between the plane in front of the rotor plane and the rotor plane.

14. A wind turbine controller, configured to:
receive one or more properties of wind in a first section of a plurality of predefined sections of a plane in front of a wind turbine rotor plane of a wind turbine,
wherein each of the plurality of sections of the plane in front of the rotor plane corresponds to a respective one of a plurality of predefined sections of the wind turbine rotor plane,
wherein a second section of the plurality of predefined sections of the wind turbine rotor plane corresponds to the first section of the plane in front of the wind turbine rotor plane,
and wherein the plurality of predefined sections of the wind turbine rotor plane are defined as angles of rotation of a rotor of the wind turbine;
determine a pitch angle assigned to the second section based on the one or more properties of wind in the first section; and
adjust a pitch angle of a wind turbine blade to the pitch angle assigned to the second section as the wind turbine blade passes through the second section.

15. The wind turbine controller of claim 14, wherein the controller is further configured to determine expected one or more properties of wind in the second section based on the one or more properties of wind determined in the first section, and determine the pitch angle of the second section based on the expected one or more properties of wind in the second section.

16. The wind turbine controller of claim 14, wherein the one or more properties of wind in the first section are measured with a light detection and ranging (LIDAR) device.

17. The wind turbine controller of claim 14, wherein the pitch angle of the second section is an offset value that is applied to a common pitch reference angle applied to all blades of the wind turbine.

18. The wind turbine controller of claim 14, wherein determining the pitch angle of the second section comprises comparing an expected blade load value to a blade load reference value to obtain a desired pitch angle value, wherein the desired pitch angle maintains blade loads at or below the blade load reference value.

19. The wind turbine controller of claim 14, wherein adjusting a pitch angle of a wind turbine blade to the pitch angle of the second section as the wind turbine blade passes through the second section comprises compensating the pitch angle of the second section based on wind field propagation and pitch system dynamics.

20. The wind turbine controller of claim 14, wherein correspondence between sections is dynamically determined based on a model defining a transformation of a wind field between the plane in front of the rotor plane and the rotor plane.

\* \* \* \* \*